United States Patent Office 3,005,011
Patented Oct. 17, 1961

3,005,011
METHOD FOR PRODUCING TRIETHYL BORATE
Robert E. Bohm and Howard Steinberg, Fullerton, Calif., assignors to United States Borax & Chemical Corporation, Los Angeles, Calif., a corporation of Nevada
No Drawing. Filed Mar. 3, 1960, Ser. No. 12,506
6 Claims. (Cl. 260—462)

This invention relates as indicated to a method for producing triethyl borate and has more specific reference to a continuous method for the direct production of substantially pure triethyl borate.

The methods of prior art practices for the production of triethylborate commonly require that an ethylborate-ethanol azeotrope be prepared and subsequently separated to produce the substantially pure triethylborate.

It is therefore the principal object of this invention to provide an economical and efficient process for the continuous preparation of substantially pure triethyl borate.

A further obect of this invention is to provide a method for the direct preparation of substantially pure triethyl borate which obviates the necessity of first forming an ester-alcohol azeotrope.

A still further object of this invention is to provide a continuous method for the direct preparation of substantially pure triethyl borate which method eliminates the necessity of prereacting boric acid and ethyl alcohol and which method produces substantially pure ester from a single distillation step.

Other objects will appear as the description proceeds.

To the accomplishment of the foregoing and related ends, the invention then comprises the features hereinafter fully described and pointed out in the claims, the following description setting forth in detail certain illustrative embodiments of the invention, these being indicative, however, of but a few of the many ways in which the principle of the invention may be employed.

Broadly stated, the present invention comprises a method for continuously producing substantially pure triethyl borate which comprises feeding a solution of at least about three moles of ethyl alcohol per mole of boric acid to the intermediate portion of a vertically disposed fractionating column while simultaneously feeding an azeotroping agent to said column above said intermediate portion and feeding free ethyl alcohol to said column below said intermediate portion; said azeotroping agent being inert to triethyl borate, capable of forming a ternary azeotrope with ethyl alcohol and water having a constant boiling point less than about 115° C.; said free ethyl alcohol added in at least the stoichiometric amount necessary to make a ternary azeotrope with the water of reaction formed from the reaction of ethyl alcohol and boric acid and said azeotroping agent; establishing and maintaining a reflux ratio in said column such that the ternary azeotrope of water, ethyl alcohol and said azeotroping agent is removed from the top of the column and substantially pure triethyl borate ester is removed from the bottom of the column.

From the foregoing broadly stated paragraph it will be seen that the present invention eliminates the necessity of first reacting boric acid and ethyl alcohol, which reaction, as well known to the art, forms a borate ester-alcohol azeotrope. It also will be noted that the present process continuously produces and recovers substantially pure ester in a single step using a single fractionating column.

With regard to the proper azeotroping agent to be used in the process, there are many compounds inert to triethyl borate that will form a ternary azeotrope with ethyl alcohol and water and wherein said azeotrope has a constant boiling point below about 115° C. Such common compounds as benzene, toluene and chlorobenzene are but a few that will perform in the prescribed manner. In the preferred embodiment of the invention we use benzene as the azeotroping agent; however, the use of benzene should not be construed as a limiting factor in the process.

Referring now to the ethyl alcohol fed into the column below the intermediate portion, as seen in the foregoing broadly stated paragraph, this alcohol has been referred to as free alcohol. This designation is used so as to clearly distinguish over the alcohol used for making the solution with the boric acid and which solution is fed into the intermediate portion of the column. The free alcohol is added to the column in at least the stoichiometric amount necessary to form the ternary azeotrope with water and the azeotroping agent. In the present process the amount of water formed is dependent upon the reaction of the boric acid and ethyl alcohol and thus is a constant factor, the azeotroping agent is fed into the column in about the amount necessary to form the ternary azeotrope; however, in the preferred embodiment of our invention the free alcohol is fed into the column in excess of the stoichiometric amount necessary to form the ternary azeotrope with water and the azeotroping agent. It has been found that the excess of free alcohol enhances the present process and excess in amounts up to 50% over the stoichiometric amount necessary to form the ternary azeotrope can be used. Any excess free alcohol over the amount used to form the ternary azeotrope is carried out with the ternary azeotrope and does not interfere with the product.

Practically none of the alcohol or azeotroping agent is lost, since after removal from the top of the fractionating column they can be recovered by any of the processes well known to those skilled in the art.

As for the quantities of boric acid and ethyl alcohol in solution, they are fed into the intermediate portion of the column in a ratio of at least three moles of alcohol per mole of boric acid. The ratio of three moles of alcohol per mole of boric acid represents the theoretical stoichiometry of the equation

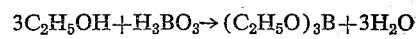

$$3C_2H_5OH + H_3BO_3 \rightarrow (C_2H_5O)_3B + 3H_2O$$

to form triethyl borate ester. In the preferred embodiment of our invention we use an excess of about two to three moles of alcohol in the solution which is fed into the intermediate portion of the column.

So that the present invention is more clearly understood, the following examples are given:

The apparatus used in the following examples comprised a fractionating column fabricated from a 65 plate, Oldershaw-type sieve tray column with three feed points at trays numbered 40, 29 and 15, respectively. At the bottom, as an integral part of the column, there was a thermosyphon-type reboiler having low retention, equipped with a cartridge-type Chromalox heater. The triethyl borate flow out of the reboiler was controlled by a bottoms level controller to a product receiver. A magnetically controlled tipping bucket head was provided at the top of the column for control of the reflux ratio and removal of the ternary azeotrope. The feed was metered through a Fischer Porter flowmeter and the temperature was controlled with a Gardsman JP temperature controller.

*Example I*

The reboiler was filled with substantially pure triethyl borate and the reboiler temperature set at 120° C. A solution of ethyl alcohol and boric acid was added to the fractionating column at tray #29 in a ratio of 5 moles of ethyl alcohol to 1 mole of boric acid at a rate of 90 grams per hour. At the same time benzene was added at tray #40, at the rate of 167 grams per hour, which is the stoichiometric amount necessary to form the ternary azeotrope with water and ethyl alcohol. The ethyl alcohol which completes the stoichiometry of the reaction was added to tray #15 at 13.35 grams per hour. The following table lists the results of the example:

| Time (Hrs.) | Feed Rates (g./Hr.) | | | Reflux Ratio | Temperatures, °C. | | Percent Boron by Analysis | |
|---|---|---|---|---|---|---|---|---|
| | Admixture | Benzene | Alcohol | | Head | Reboiler | Head | Bottom |
| 0 | 90 | 167 | 13.35 | 3:1 | 66 | 118 | 0 | 7.4 |
| 0.5 | 90 | 167 | 13.35 | 3:1 | 67 | 118 | 0 | 7.45 |
| 1.0 | 90 | 167 | 13.35 | 3:1 | 66 | 120 | 0 | 7.45 |
| 1.5 | 90 | 167 | 13.35 | 3:1 | 68 | 122 | Trace | 7.48 |
| 2.0 | 90 | 167 | 13.35 | 3:1 | 69 | 128 | Trace | 7.70 |

Theoretical boron content of triethyl borate=7.42%.

Example II

Example I was repeated except that 13 percent excess ethanol was used and the feed rates were varied slightly. The molar ratio of the solution of ethyl alcohol to boric acid was increased to 5.6 moles of ethyl alcohol to every 1 mole of boric acid and the delivery rate was increased to 100 grams per hour. 18 grams of ethanol per hour was delivered to tray #15 while 170 grams of benzene per hour was delivered at tray #40. The following table lists the findings of this example:

| Time (Hrs.) | Feed Rates (g./Hr.) | | | Reflux Ratio | Temperatures, °C. | | Percent Boron by Analysis | |
|---|---|---|---|---|---|---|---|---|
| | Admixture | Benzene | Alcohol | | Head | Reboiler | Dist. | Prod. |
| 0 | 100 | 170 | 18 | 3:1 | 64.5 | 118 | 0 | 7.40 |
| 0.5 | 100 | 170 | 18 | 3:1 | 65.5 | 120 | 0 | 7.40 |
| 1.0 | 100 | 170 | 18 | 3:1 | 66.0 | 120 | 0 | 7.42 |
| 1.5 | 100 | 170 | 18 | 3:1 | 68.0 | 118 | Trace | 7.45 |
| 2.0 | 100 | 170 | 18 | 3:1 | 67.5 | 120 | 0 | 7.35 |
| 2.5 | 100 | 170 | 18 | 3:1 | 68 | 120 | 0 | 7.40 |
| 3.0 | 100 | 170 | 18 | 3:1 | 68 | 120 | 0 | 7.45 |
| 3.5 | 100 | 170 | 18 | 3:1 | 68 | 122 | Trace | 7.48 |
| 4.0 | 100 | 170 | 18 | 3:1 | 68 | 118 | 0 | 7.40 |
| 4.5 | 100 | 170 | 18 | 3:1 | 68 | 118 | 0 | 7.40 |
| 5.0 | 100 | 170 | 18 | 3:1 | 68 | 120 | 0 | 7.45 |

From the foregoing description it will be seen that the process is applicable to continuous operation and that the product yielded is substantially pure triethyl borate. It will also be noted that the process is applicable when stoichiometric amounts of the reactants are used; however, control of the process is much simpler when an excess of ethyl alcohol is used.

Other modes of applying the principle of the invention may be employed provided the features stated in any of the following claims or the equivalent of such be employed.

We, therefore, particularly point out and distinctly claim as our invention:

1. A method for continuously producing triethyl borate ester which comprises feeding a solution of at least about 3 moles of ethyl alcohol per mole of boric acid to the intermediate portion of a vertically disposed fractionating column while simultaneously feeding free ethyl alcohol to said column below said intermediate portion and feeding an azeotroping agent to said column above said intermediate portion; said azeotroping agent being inert to triethyl borate ester, capable of forming a ternary azeotrope with ethyl alcohol and water and having a constant boiling point less than about 115° C.; said free ethyl alcohol added in at least the stoichiometric amount necessary to make a ternary azeotrope with the water of reaction formed from the reaction of ethyl alcohol and boric acid and said azeotroping agent; establishing and maintaining a reflux ratio in said column such that the ternary azeotrope of water, ethyl alcohol and said azeotroping agent is removed from the top of the column and substantially pure triethyl borate ester is removed from the bottom of the column.

2. The method of claim 1 wherein said free alcohol is added in an amount of from 0–50% in excess of the stoichiometric amount necessary for the formation of the ternary azeotrope of water, azeotroping agent and ethyl alcohol.

3. The method of claim 1 wherein said solution comprises about five moles of ethyl alcohol per mole of boric acid.

4. The method of claim 1 wherein the azeotroping agent is selected from the group consisting of benzene, toluene and chlorobenzene.

5. A method for continuously producing triethyl borate ester which comprises feeding a solution of about 3 to about 6 moles of ethyl alcohol per mole of boric acid to the intermediate portion of a vertically disposed fractionating column, while simultaneously feeding free ethyl alcohol to said column below said intermediate portion and feeding an azeotroping agent selected from the group consisting of benzene, toluene and chlorobenzene to said column above said intermediate portion; said free ethyl alcohol added in an amount of from 0–50% in excess of the stoichiometric amount necessary for the formation of the ternary azeotrope of water, azeotroping agent and ethyl alcohol; establishing and maintaining a reflux ratio in said column such that the ternary azeotrope of water, ethyl alcohol and said azeotroping agent is removed from the top of the column and substantially pure triethyl borate ester is removed from the bottom of the column.

6. The method of claim 5 wherein said azeotroping agent is benzene.

References Cited in the file of this patent

UNITED STATES PATENTS

| | | |
|---|---|---|
| 2,642,453 | Lippincott | June 16, 1953 |
| 2,813,115 | Bragdon | Nov. 12, 1957 |